Figure 1:
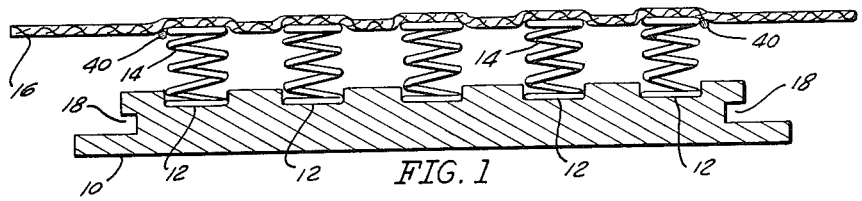

March 8, 1966  S. M. TERRY ET AL  3,239,584
METHOD OF FABRICATING A SEAT OR CUSHION OF COMBINED
SPRINGS AND RESILIENT PAD CONSTRUCTION
Filed Feb. 24, 1964

INVENTORS
SAMUEL M. TERRY
JOHN S. MEYERS
BY Beaman & Beaman
ATTORNEYS

United States Patent Office 3,239,584
Patented Mar. 8, 1966

3,239,584
METHOD OF FABRICATING A SEAT OR CUSHION OF COMBINED SPRINGS AND RESILIENT PAD CONSTRUCTION
Samuel M. Terry, Ann Arbor, and John S. Meyers, Allen Park, Mich., assignors to Hoover Ball and Bearing Company, Saline, Mich., a corporation of Michigan
Filed Feb. 24, 1964, Ser. No. 346,931
2 Claims. (Cl. 264—45)

The present application is a continuation-in-part of our application Serial Number 13,002, filed March 7, 1960, now Patent No. 3,122,360.

The present invention relates to improvements in the method of making wire assemblies for the seats and backs of vehicles, furniture, and the like, as will as for general purpose resilient supporting surfaces such as mattresses, cushions, and similar structure. More specifically, the invention is concerned with the provision of a method for making relatively thin, highly flexible and resilient spring wire assemblies in which the spring wire elements are associated with a mold slab of resilient foam material, the slab being insulated or protected from the spring wire elements by a sheet of open mesh fabric through which the slab is foamed to bond the slab, fabric and spring wire elements into a unitary structure.

In carrying out the method of the present invention, it is proposed to combine the foam slab, fabric insulator and spring wire elements into a unitary structure during the molding operation. In practice, the product of the method may take the form of a slab of urethane foam which, in the mold, reacts against and through the openwork fabric and about portions of the spring wire elements to bond the fabric and the elements to the body of the slab of foam material. The chemical reaction of the foam with the fabric improves its structural properties and assures the support of the spring wire elements against penetration into the body of the foam slab under conditions of the kind of use experienced in vehicle seats and backs. In vehicle seating, it has long been the practice to use openwork cotton net, burlap and the like for the insulating fabrics disposed over the supporting surface of the spring wire elements of the spring structures. We propose to use this fabric to support the spring elements in the mold during the foaming of the slab. In carrying out the method of manufacture of the present invention, the spring wire elements are supported upon a suitable fixture, such as the mold cover, to space and support the same. As supported upon the fixture, the openwork or open mesh fabric is imposed upon the exposed side of the spring wire elements to help confine the same between the fixture and the fabric and the marginal portions of the fabric are attached to the fixture. This assembly is then inserted and suspended in the mold for the foam slab, the fabric being spaced above the bottom of the mold by the spring wire elements a distance approximately the thickness of the cured slab. As the chemical reaction takes place in the mold, the foam is leveled and distributed by the openwork fabric with a portion of the foam passing through the interstices of the fabric and embracing and/or bonding with the spring wire elements. Following a precure in the mold, the foam slab, openwork fabric insulator and spring wire element assembly is removed from the mold by detaching the marginal portions of the fabric from the fixture.

Thus an object of the invention is to provide improvements in the method of making components used in seating structure in which a flexible slab of cellular reaction material has integrally associated therewith an insulator and a plurality of spring wire elements.

Another object is to provide a method of bonding and/or embedding spring wire elements in or to a flexible slab of molded cellular reaction material which involves the step of disposing a flexible openwork sheet between the foamed reaction material and the elements, the sheet acting as an insulator between the elements and the slab and leveling the reaction material during expansion while permitting the portion of reaction material to penetrate the sheet and bond and/or embedding the spring wire elements, the sheet being used to support the spring wire elements in position during the molding operation.

These and other objects and advantages residing in the present invention will more fully appear from a consideration of the following specification and the appended claims.

Figure 2:
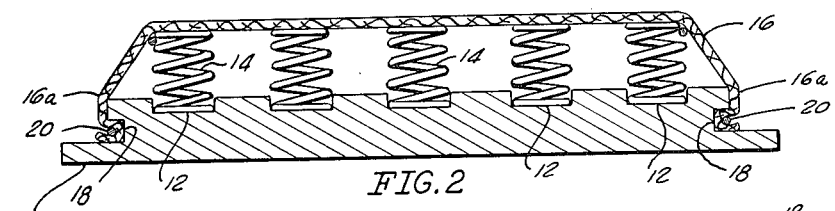
Figure 3:
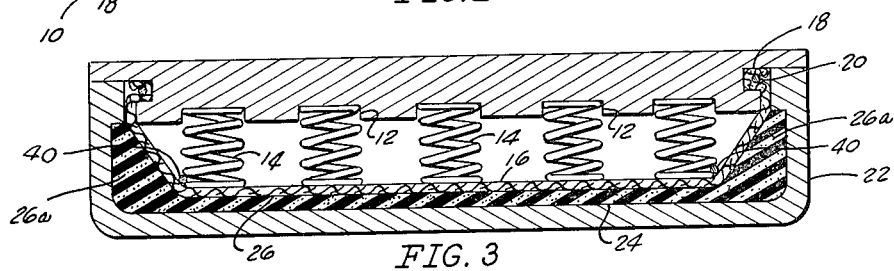
Figure 4:
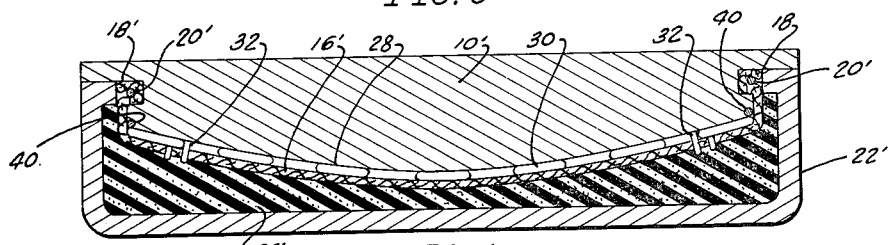
Figure 5:
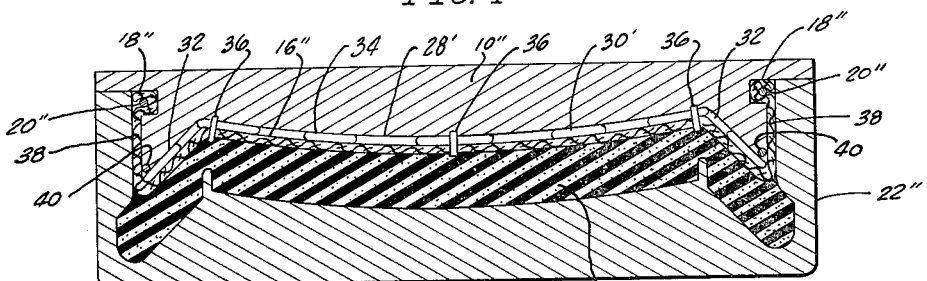
Figure 6:
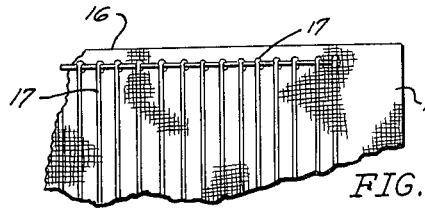

In the drawings:

FIG. 1 is a diagrammatic view of an inverted mold cover showing the spring elements and insulator fabric loosely associated therewith, FIG. 2 is a view similar to FIG. 1 showing the fabric attached to the mold cover in a position to support the spring elements when the cover is inverted, FIG. 3 shows the cover assembly of FIG. 2 located in the mold structure, FIG. 4 is a view similar to FIG. 3 of another form of the invention, FIG. 5 is a view similar to FIG. 3 of a further form of the invention, and FIG. 6 is a fragmentary plan view of the insulator fabric.

In the three illustrated forms of the invention, the use of the insulating fabric is shown in FIG. 1 as supporting spring wire elements in the form of coils while in the forms of FIGS. 4 and 5 the fabric is shown supporting spring wire elements of the zigzag or formed wire type.

Referring to FIG. 1, the fixture for supporting the coil springs during the molding operation is preferably the top or cover 10 of the mold. As shown, recesses 12 are provided on the underside of the cover 10 into which the coils 14 are inserted with the cover 10 inverted. The openwork fabric 16 of burlap, cotton net, or the like, such as used in this art for providing a flexible fabric insulator between the spring wire elements and upholstery pad, is shown laid upon the top of the coils 14. If desired, the fabric 16 may have the portions disposed in direct contact with the outermost convolutions of the coils 14, laced or otherwise associated with spaced parallel reinforcing wires 17 in a well known manner.

FIG. 2 shows the marginal edges 16a of the fabric 16 drawn down to slightly compress the coils 14, with such edges extending into the groove 18 and being held in position by some suitable clamping or wedging member 20, such as a resilient band of close wound helical wire, or the like. It is to be understood that the coils 14 may be snugly fitted in the recesses 12 so that the fabric 16 is relieved of the weight thereof and has its function confined to the location of the projected ends of the coils 14.

In the simplest form, the edge 16a of the fabric 16 may be merely tacked, or otherwise suitably attached to the sides of the cover 10 with the elimination of the groove 18 and the resilient band 19.

As shown in FIG. 3, when the cover 10 is turned over from its position of FIG. 1 and placed on the mold 22, the fabric 16 will function to support and locate, in their proper position, the coils 14 having their opposite ends within the recesses 12, the resiliency of the coils 14 extending the fabric 16 to locate the same the desired distance from the bottom 24 of the mold 22 to provide the proper thickness of the molded slab 26.

The fabric 16 will have a leveling action on the foam forming the slab 26 as it is generated by the chemical reaction which takes place when the materials involved are associated within the mold, as in the case of urethane foam, with a small portion of the foam passing through the interstices of the fabric 16 and bonding the fabric 16 as well as the spring wire elements in the manner disclosed in said copending application and as also disclosed in United States Patent No. 3,005,213.

Following the foam action in the mold 22 and the following cure of the reaction material to the point permitting the material to be removed from the mold 22, the cover 10 will be removed from the mold 22 and when the marginal edges 16a of the fabric 16 are released from the groove 18, the unitary assembly of FIG. 3 of the foam slab 26, fabric insulator 16, and spring coils 14 may be separated from the cover 10. Such further curing of the slab 26 as may be necessary can thereafter take place and the mold 22 can be cleaned and reused.

In the form of the invention of FIG. 4, the molding cover 10 has a convexed under surface 28 on which a plurality of zigzag spring elements 30 in spaced parallel arrangement within a border frame have been placed in position with the cover 10' inverted. Locating pins 32 carried by the cover 10' may be employed to locate the assembly of the elements 30 on the surface 28. The fabric 16' is then employed to hold the elements 30 to the surface 28 by having its marginal portions clamped in the grooves 18'. When the slab 26' is formed by molding, the foam which passes the fabric 16' will embrace the spring elements 30 and be confined by the surface 28. Upon curing, the slab 26', fabric 16' and the assembly of the elements 30 will all be bonded into one unitary structure.

FIG. 5 shows a bucket seat for vehicles being molded according to the method of the present invention. The lower surface 28' of the cover 10" is of a slightly different form than that shown in FIG. 4. Also the assembly of zigzag spring elements 30' is shown with their end portions 32 flared with respect to their slightly crowned central portions. The fabric insulator 16' is shown hog ringed at 36 to the elements 31' in a well known manner to hold the fabric in place while permitting the marginal portions 38 of the fabric to be carried around the bonded frame of the end portions 32 to be clamped in the grooves 18" by the members 20". When the slab 26" is foamed and cured, the bonding of the slab 26", assembly of elements 30' and fabric insulator 16" will take place in the same manner as described in regard to the form of FIG. 4.

FIG. 6 shows a fragmentary plan view of the fabric 16 constituting the insulator and it is provided with reinforcing wires 17 shown in the area of the fabric insulator which is in contact with the coils 14. Preferably, no wires are used in the marginal portions 16a.

It will be noted that the marginal portions 16a of the fabric 16 serves to support and/or position the spring wire elements in the mold during the molding operation of the foam slab of the unitary assembly. These same edges may also reinforce and define, with the walls of the mold, depending skirt portions on the molded slab, as shown at 26a in FIG. 3. They have the further purpose, if desired, of being used in connection with the upholstering of the seating structure.

In practice, and in a well known manner, the marginal spring elements, or portions thereof, will usually be attached to a wire border frame such as indicated at 40 in FIGS. 1, 4 and 5 over which the fabrics 16, 16' and 16" may be tensioned when the marginal portions of the fabric are drawn down and clamped in the grooves of the mold cover as shown in FIG. 2.

Having thus described our invention, what we claim as new and desire to protect by Letters Patent is:

1. A method of fabricating a unitary assembly of a molded foam slab, spring wire elements and a fabric insulator for the elements positioned generally between the elements and the slab so as to protect the slab, comprising the steps of providing a female mold, providing a mold cover on said mold, locating the elements on the cover so that they project downwardly into the mold, disposing the fabric over the elements on the sides thereof most removed from said cover and attaching the marginal portions of said fabric to the mold cover to support said elements in a depending position on the underside of said cover to locate the elements and fabric in a spaced relation with respect to the bottom of the mold, placing a foam material in the bottom of said mold, and foaming said material to form said slab so that it is bonded to said elements and said fabric.

2. A method of fabricating a unitary assembly of a molded foam slab, spring wire elements and a fabric insulator for the elements to protect the slab, comprising the steps of providing a molding structure having a bottom and an upper section, locating the elements in the upper section of the molding structure, disposing the fabric over the elements on the sides thereof most removed from the underside of said upper section and attaching the marginal portions of said fabric to the molding structure to support said elements in a depending position on the underside of said upper section to locate the elements and fabric with respect to the bottom of the molding structure, placing a foam material in the bottom of said mold, foaming said material into contact with and through said fabric so as to form said slag so that it is bonded to said elements and said fabric, and spacing the fabric from a surface of molding structure between its point of attachment with the molding structure and its point of engagement with the spring elements whereby said fabric serves to shape a portion of the molded slab.

References Cited by the Examiner

UNITED STATES PATENTS

| | | | |
|---|---|---|---|
| Re. 24,529 | 9/1958 | Mantegna | 267—84 |
| 2,184,396 | 12/1939 | Mudge | 267—84 XR |
| 2,785,440 | 3/1957 | Toulmin | 264—45 |
| 2,817,875 | 12/1957 | Harris et al. | 264—47 XR |
| 3,005,213 | 10/1961 | Brown et al. | 264—45 XR |
| 3,090,154 | 5/1963 | Harris | 264—45 XR |

FOREIGN PATENTS

| | | |
|---|---|---|
| 213,094 | 2/1958 | Australia. |
| 824,244 | 12/1951 | Germany. |
| 596,847 | 8/1959 | Italy. |

ALEXANDER H. BRODMERKEL Primary Examiner.